(12) United States Patent
Keen et al.

(10) Patent No.: US 8,938,469 B1
(45) Date of Patent: Jan. 20, 2015

(54) DYNAMICALLY ADJUSTING HASH TABLE CAPACITY

(75) Inventors: John Keen, Mountain View, CA (US); Jean-Marc Frailong, Los Altos Hills, CA (US); Deepak Goel, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 370 days.

(21) Appl. No.: 13/239,774

(22) Filed: Sep. 22, 2011

Related U.S. Application Data

(60) Provisional application No. 61/485,079, filed on May 11, 2011, provisional application No. 61/485,074, filed on May 11, 2011.

(51) Int. Cl.
  *G06F 17/30* (2006.01)

(52) U.S. Cl.
  USPC ........... 707/769; 707/747; 711/216; 711/220; 711/221

(58) Field of Classification Search
  USPC .................................. 707/747, 769; 711/216
  See application file for complete search history.

(56) References Cited

U.S. PATENT DOCUMENTS

| | | | |
|---|---|---|---|
| 6,434,662 B1 * | 8/2002 | Greene et al. | 711/108 |
| 6,768,739 B1 | 7/2004 | Kobayashi et al. | |
| 8,005,868 B2 | 8/2011 | Saborit et al. | |
| 8,018,940 B2 | 9/2011 | Hao et al. | |
| 2009/0182726 A1 | 7/2009 | Wang | |
| 2009/0228433 A1 | 9/2009 | Aguilar Saborit et al. | |
| 2010/0080144 A1 * | 4/2010 | Greenberg et al. | 370/253 |
| 2010/0098081 A1 | 4/2010 | Dharmapurikar et al. | |
| 2010/0284405 A1 | 11/2010 | Lim | |

OTHER PUBLICATIONS

U.S. Appl. No. 12/425,517, by Arun Kumar S P et al., filed Apr. 17, 2009.
U.S. Appl. No. 13/239,915 by John Keen, filed Sep. 22, 2011.
Berenbrink et al., "Balanced Allocations: The Heavily Loaded Case," SIAM J. Comput. vol. 35 No. 6, pp. 1350-1385, Aug. 2005.
Kirsch et al., "More Robust Hashing: Cuckoo Hashing With a Stash," Siam J. Comput., vol. 39, 4, pp. 1543-1561, Oct. 2009.
Pagh et al., "Cuckoo Hashing," Preprint submitted to Elsevier Science Dec. 8, 2003, 27 pp.

(Continued)

*Primary Examiner* — Monica Pyo
(74) *Attorney, Agent, or Firm* — Shumaker & Sieffert, P.A.

(57) ABSTRACT

An example hashing unit includes a plurality of hardware-based hash tables, wherein each of the hash tables comprises a plurality of buckets, and wherein the plurality of hash tables comprise a set of zero or more active hash tables and a set of one or more inactive hash tables. An example hashing unit controller is configured to receive a key value to be stored in the hashing unit, determine that one of the inactive hash tables should be activated, and, based on the determination, activate the one of the set of inactive hash tables as a recently activated hash table, determine one of the buckets of the recently activated hash table to which a hash function associated with the recently activated hash table maps the received key value, and store the key value in the determined one of the buckets of the recently activated hash table.

25 Claims, 7 Drawing Sheets

(56) References Cited

OTHER PUBLICATIONS

Panigrahy, "Efficient Hashing with Lookups in two Memory Accesses," found at http://arxiv.org/PS_cache/cs/pdf/0407/0407023v1.pdf, Feb. 1, 2008, 12 pp.

Friedgut et al., "Every Monotone Graph Property Has a Sharp Threshold," American Mathematical Society vol. 124, No. 10, Oct. 1996, 10 pp.

Askitis, "Fast Compact Hash Tables for Integer Keys," presented at the 32nd Australasian Computer Science Conference (ACSC 2009), Wellington, New Zealand, Jan. 2009, 10 pp.

Dharmapurikar et al., "Longest Prefix Matching Using Bloom Filters," IEEE/ACM Transactions on Networking, vol. 14, No. 2, Apr. 2006, 13 pp.

Steger et al., "Balanced Allocations: The Heavily Loaded Case," Powerpoint Presentation, Institut fur Informatik Technische Universitat Munchen, Retrieved on Mar. 1, 2011, 14 pp.

* cited by examiner

DYNAMICALLY ADJUSTING HASH TABLE CAPACITY

This application claims the benefit of U.S. Provisional Application No. 61/485,079 and U.S. Provisional Application No. 61/485,074 both filed May 11, 2011, the entire contents of which are incorporated by reference herein.

TECHNICAL FIELD

This disclosure relates to power management of hardware units in computing devices, such as routers.

BACKGROUND

Hash tables are generally used for providing a unique mapping between a set of input values, referred to as key values, and storage locations for corresponding output values, referred to as buckets. Hash tables are used in various contexts, such as, for example, database applications, implementing data structures such as associative arrays and sets, memory caches, networking applications, or other situations in which a unique mapping between input values and output values is desirable.

One technique for increasing the speed of hash tables is to provide a hardware-based hash table. When a hash table is implemented in hardware, the hash table draws power that may otherwise be budgeted to other hardware features of a hardware unit including the hash table. The amount of power consumed by the hardware-based hash table is approximately proportional to the silicon area covered by the hash table. Likewise, the amount of keys and buckets supported by the hardware-based hash table is also approximately proportional to the silicon area covered by the hash table. Thus, to support a large number of keys and buckets, a larger area of silicon must be devoted to the hash table, requiring a larger amount of power for the hash table. In many cases, hardware-based hash tables are implemented such that they support as large a set of values as possible to allow use in a wide range of applications, requiring a trade-off of chip area and power consumption for increased capacity.

SUMMARY

In general, this disclosure describes techniques for dynamically adjusting the capacity of a hardware-based hash table. By adjusting the capacity of the hash table, power consumed by the hash table may be variably controlled. Inactive portions of the hash table need not be powered, and likewise, control circuitry for the inactive portions also need not be powered. Alternatively, the control circuitry may remain powered, but not actively perform calculations related to hashing. By remaining idle, the control circuitry generally utilizes less power than when actively processing data. In this manner, a hardware-based hash table in accordance with the techniques of this disclosure may provide a relative power savings when the full capacity of the hash table is not needed, yet still providing the ability to utilize a larger capacity when required.

A hardware-based hashing unit in accordance with the techniques of this disclosure includes a plurality of hardware-based hash tables. In general, each of the hash tables can be powered on or off as needed. When the hashing unit receives a new key value that cannot be stored in one of the currently active hash tables, the hashing unit activates one of the inactive hash tables and stores the new key value in the newly activated hash table. Similarly, when the hashing unit determines that the key values currently stored in a set of active hash tables could be stored effectively in a subset of the active hash tables, the hashing unit migrates the key values from at least one of the set of active hash tables to the other hash tables in the set, then disables the hash table(s) from which key values were migrated.

This disclosure provides techniques for determining when to enable an inactive hash table as well as when to deactivate an active hash table, and techniques for migrating key values from an active hash table to a subset of other active hash tables. In this manner, this disclosure provides techniques for dynamically adjusting the capacity of a hardware-based hash table that may conserve power as well as provide a relatively large capacity for key values.

In one example, a method includes receiving, by a hashing unit controller executed by a processing unit, a key value to be stored in a hashing unit comprising a plurality of hardware-based hash tables, wherein each of the hash tables comprises a plurality of buckets, and wherein the plurality of hash tables comprise a set of zero or more active hash tables and a set of one or more inactive hash tables, determining that one of the inactive hash tables should be activated to increase an available hash space of the hashing unit, wherein the available hash space comprises the buckets of the active hash tables, and, based on the determination, activating the one of the set of inactive hash tables as a recently activated hash table, determining one of the buckets of the recently activated hash table to which a hash function associated with the recently activated hash table maps the received key value, and storing the key value in the determined one of the buckets of the recently activated hash table.

In another example, a method includes receiving, by a routing device, information defining a route to a network destination comprising a destination address, determining a network interface of the routing device coupled to a next hop along the route to the network destination, sending data comprising the destination address and an indication of the network interface to a hashing unit controller executed by a processing unit of the routing device to be stored by a hashing unit of the routing device, wherein the hashing unit comprises a plurality of hardware-based hash tables, wherein each of the hash tables comprises a plurality of buckets, and wherein the plurality of hash tables comprise a set of zero or more active hash tables and a set of one or more inactive hash tables, determining that one of the inactive hash tables should be activated to increase an available hash space of the hashing unit, wherein the available hash space comprises the buckets of the active hash tables, and, based on the determination, activating the one of the set of inactive hash tables as a recently activated hash table, determining one of the buckets of the recently activated hash table to which a hash function associated with the recently activated hash table maps the received destination address, and storing the data comprising the destination address and the indication of the network interface in the determined one of the buckets of the recently activated hash table.

In another example, a device includes a hashing unit comprising a plurality of hardware-based hash tables, wherein each of the hash tables comprises a plurality of buckets, and wherein the plurality of hash tables comprise a set of zero or more active hash tables and a set of one or more inactive hash tables, a computer-readable storage medium comprising instructions for a hashing unit controller for the hashing unit, and a processing unit configured to execute the hashing unit controller to receive a key value to be stored in the hashing unit, determine that one of the inactive hash tables should be activated to increase an available hash space of the hashing unit, wherein the available hash space comprises the buckets of the active hash tables, and, based on the determination, activate the one of the set of inactive hash tables as a recently activated hash table, determine one of the buckets of the recently activated hash table to which a hash function associated with the recently activated hash table maps the received key value, and store the key value in the determined one of the buckets of the recently activated hash table.

In another example, a routing device includes a plurality of network interfaces, a hashing unit comprising a plurality of hardware-based hash tables, wherein each of the hash tables comprises a plurality of buckets, and wherein the plurality of hash tables comprise a set of zero or more active hash tables and a set of one or more inactive hash tables, a routing engine configured to receive information defining a route to a network destination comprising a destination address, and a forwarding engine configured to generate data that associates one of the network interfaces of the routing device coupled to a next hop along the route to the network destination with the destination address, and to store the data to the hashing unit via a hashing unit controller, wherein the hashing unit controller is configured to determine that one of the inactive hash tables should be activated to increase an available hash space of the hashing unit, wherein the available hash space comprises the buckets of the active hash tables, and, based on the determination, to activate the one of the set of inactive hash tables as a recently activated hash table, determine one of the buckets of the recently activated hash table to which a hash function associated with the recently activated hash table maps the received destination address, and store the data comprising the destination address and the indication of the network interface in the determined one of the buckets of the recently activated hash table.

In another example, a computer-readable storage medium includes instructions that, when executed, cause a processor to receive a key value to be stored in a hashing unit comprising a plurality of hardware-based hash tables, wherein each of the hash tables comprises a plurality of buckets, and wherein the plurality of hash tables comprise a set of zero or more active hash tables and a set of one or more inactive hash tables, determine that one of the inactive hash tables should be activated to increase an available hash space of the hashing unit, wherein the available hash space comprises the buckets of the active hash tables, and, based on the determination, activate the one of the set of inactive hash tables as a recently activated hash table, determine one of the buckets of the recently activated hash table to which a hash function associated with the recently activated hash table maps the received key value, and store the key value in the determined one of the buckets of the recently activated hash table.

The techniques of this disclosure may provide several advantages. For example, a hashing unit in accordance with this disclosure provides a relatively high capacity for key value storage. Additionally, the hashing unit provides a relative power savings over hash tables having a similar capacity, in that individual hash tables of the hashing unit of this disclosure can be powered on or off. In this manner, the hashing unit provides flexible configurability. A software-based controller can programmatically enable and disable individual hash tables within a set of hash tables of the hashing unit to provide sufficient capacity for key values of a particular application or environment while managing power consumption. In this manner, the power consumed by the hashing unit of this disclosure is roughly proportional to the size of the set of key values stored by the hashing unit rather than fixed at the maximum capacity of the hashing unit. Therefore, power consumption can be adjusted according to an application's requirements for hash storage capacity (also referred to in this disclosure as a hash space). In addition to reducing power consumption, when other data structures are stored in the same physical memory as a disabled hash table, these techniques may also reduce memory bandwidth and contention with other operations.

The details of one or more examples are set forth in the accompanying drawings and the description below. Other features, objects, and advantages will be apparent from the description and drawings, and from the claims.

DETAILED DESCRIPTION

Figure 1:
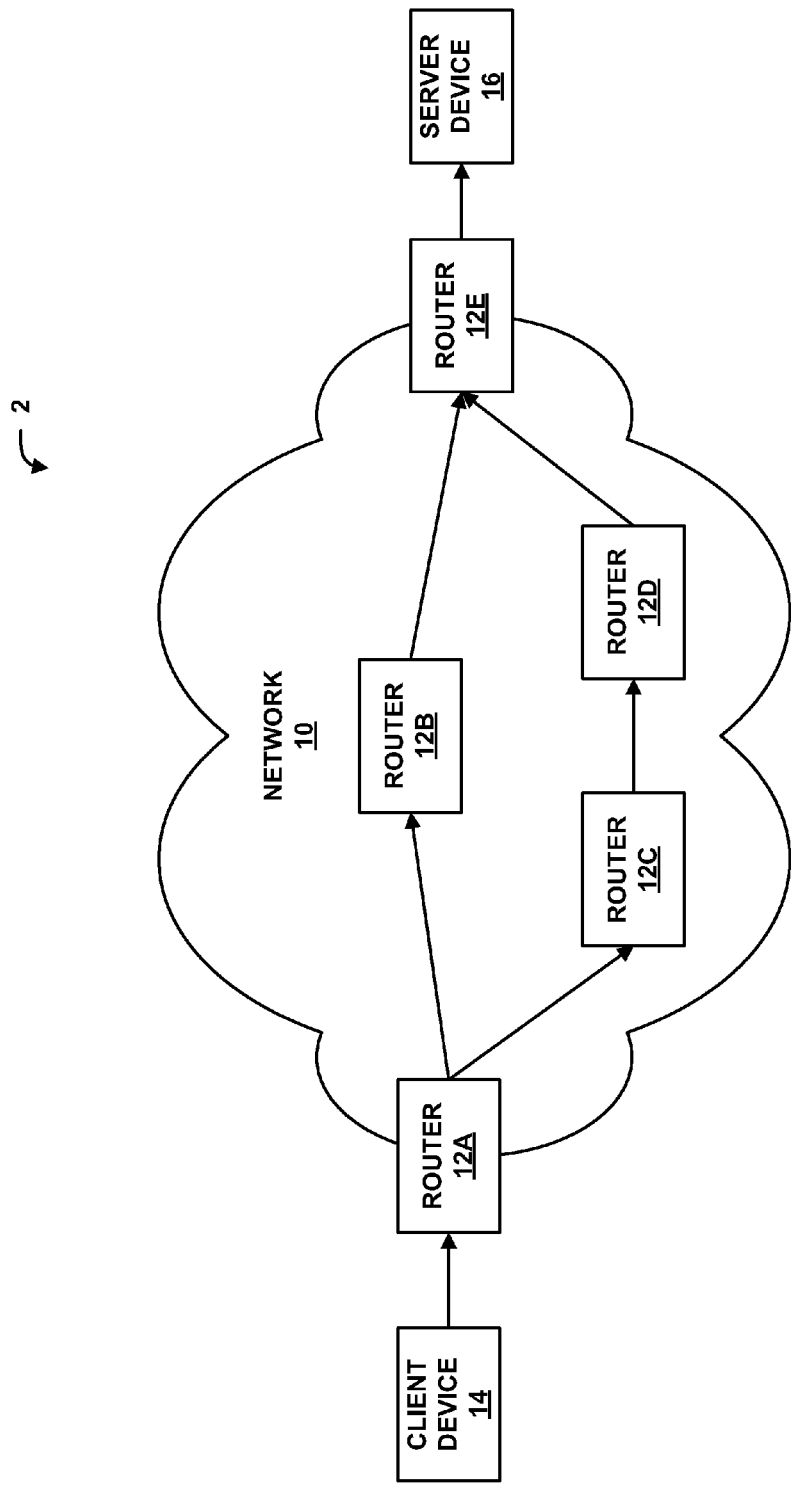
FIG. 1 is a block diagram illustrating an example system including a variety of network devices, any of which may implement hashing techniques of this disclosure.

FIG. 1 is a block diagram illustrating an example system 2 including a variety of network devices, any of which may implement hashing techniques of this disclosure. The example of FIG. 1 includes client device 14 and server device 16, which communicate via network 10. Network 10 includes routers 12A-12E (routers 12). In other examples, additional or alternative network devices, such as gateways, switches, hubs, security devices, servers, databases, printers, or other devices may be present in system 2, any or all of which may implement the hashing techniques of this disclosure.

Client device 14, in this example, represents a device that submits requests for services to server device 16. Server device 16, likewise, represents an example of a device that provides services to client device 14 in response to requests. Client device 14 and server device 16 may also participate in a bidirectional communication session, in which server device 16 requests services from client device 14, and client device 14 provides the requested services to server device 16. In this manner, client device 14 and server device 16 can each act as both a server and a client. Client device 14 may represent an endpoint device, such as a mobile device (e.g., a laptop computer, tablet computer, or cellular phone), a personal computer, a computing terminal, an Internet-capable television or device for providing Internet-based television services, or other such devices. Server device 16 may represent a web server, a file server, a peer device (e.g., another user's computing device), a database server, a print server, or other device from which a client device requests services.

Client device 14 submits requests to server device 16 via network 10. In particular, in this example, client device 14 is communicatively coupled to router 12A. In other examples, client device 14 may be communicatively coupled to router 12A via additional network devices, such as access lines, wireless infrastructure and backhaul networks, and the like. Routers 12 of network 10 are configured to determine routes through network 10 to reach various destinations, such as server device 16. Routers 12 implement routing protocols to determine routes through network 10, as well as to share determined routes with other routers 12. In the example of FIG. 1, router 12A determines that two routes exist to reach server device 16. A first route beginning at router 12A to reach server device 16 includes router 12B, router 12E, and server 16. A second route beginning at router 12A to reach server device 16 includes router 12C, router 12D, router 12E, and server 16. In general, router 12A includes a control plane that executes routing protocols to learn the topology of network 10 and to select one of these routes over the other. Upon receiving a packet of data from client device 14 destined for server device 16, a data plane of router 12A performs a lookup function on keying information within the packet and forwards the data along the selected route.

In some examples, router 12A stores routing information for known routes in one or more routing tables or other data structures, also referred to as a routing information base (RIB). The control plane of router 12A generates forwarding information based on the routing tables in the form of one or more forwarding tables or other data structures, also referred to as a forwarding information base (FIB), and programs the data plane in accordance with the forwarding information. The FIB stores network addresses or other keying information (e.g., MPLS labels) and maps the keying information with particular logical or physical network interfaces of router 12A. Upon receiving a packet of data from client device 14, router 12A can determine a network interface through which to send the packet based on the keying information of the packet such that the packet ultimately reaches, for example, a destination address specified in the packet. In one example, the data plane of router 12A includes a packet forwarding engine having dedicated application-specific integrated circuits that are programmed in accordance with the FIB for forwarding network traffic.

In some examples, the forwarding engine implements a longest prefix match algorithm when forwarding an individual packet to identify an entry of the FIB that best matches the destination address of the packet. For example, the FIB typically stores network addresses in the form of network prefixes that are reachable through other routers within the network. As one example, router 12A may not necessarily learn the specific network address of individual server device 16 (e.g., 10.1.1.101), but instead may learn that a network prefix (i.e., a range of addresses) are reachable through router 12E (e.g., network prefix 10.1/16). In general, the forwarding engine of router 12A uses the longest prefix match algorithm to determine the entry in the FIB having the longest prefix that matches the destination address of a received packet. Router 12A forwards the received packet through the network interface specified in the entry of the FIB identified as storing the longest matching prefix that is satisfied by the destination address of the received packet.

In one example, the hashing unit supports prefix lengths (which act as key values in the hashing unit) from /0 to /128. Prefixes with lengths from /0 to /64, in some examples, consume a single cell of a bucket of the hashing unit, while prefixes with prefix lengths from /65 to /128 consume two consecutive cells, referred to as a double cell, in the hashing unit. Hash tables of the hashing unit, in some examples, physically support 64K single cells, with two cells per bucket. In some examples, if all prefixes are of single cells, each hash table can support loads of approximately 80% to 90% (e.g., 51,000 to 57,600 entries). In some examples, if all prefixes are of double cells, each hash table of the hashing unit can support loads of approximately 40% to 45% (e.g., 28,800 entries). In some examples, the hashing unit includes a stash in addition to a plurality of hardware-based hash tables. In some examples, the stash includes four buckets with two cells in each bucket, for a total of eight single cells. Likewise, the stash can store four double cells in these examples. The physical hash tables of a hashing unit may be referred to as key hash tables or KHTs. In some examples, each KHT has a capacity of approximately 16K cells and associated results, which for four KHTs would provide approximately 64K cells total.

In accordance with the techniques if this disclosure, the FIB of router 12A is stored in a hashing unit having a plurality of physical (that is, hardware-based) hash tables. In accordance with the techniques of this disclosure, the hashing unit is able to activate or deactivate individual hash tables. In this manner, router 12A is able to dynamically increase or decrease the number of active hash tables, in order to increase or decrease a hash space for the hashing unit. The hash space generally corresponds to the number of entries that can be stored in the hashing unit. Accordingly, router 12A can determine whether additional storage space is needed, e.g., to increase the number of entries stored in the FIB, and if so, activate an inactive hash table. Similarly, router 12A can also determine whether to deactivate an active hash table, e.g., when the FIB does not need to store as many entries.

The number of physical hash tables provided by the hashing unit may be large enough to store a relatively large FIB. A FIB may typically vary between several thousand and several hundred thousand entries, and therefore, the hashing unit may provide a hash space capable of storing several hundred thousand entries, with the flexibility to decrease the available storage capacity to several thousand or tens of thousands of entries. For example, a hashing unit may include four hash tables, each capable of storing approximately 16K cells. When less than the full storage capacity is needed, one or more of the hash tables can be powered off. In this manner, the power consumed by the hash tables of the hashing unit may vary according to the number of entries needed to be stored. In general, the hash tables need not be capable of storing the same amount of entries, although in some examples, the hash tables may be capable of storing approximately equal numbers of entries.

More particularly, the hashing unit provides a hash function for each of the hash tables. The hash function receives a value, referred to as a key value, and outputs a value for a "bucket," that is, an entry in the corresponding hash table. In some examples, the value corresponds to a memory address for the bucket in the hash table. Each bucket stores one or more cells. Therefore, the number of entries that can be stored in a particular hash table is equal to C*B, where B is an integer value representing the number of buckets in the hash table, while C is an integer value representing the number of cells in each bucket (assuming that the number of cells in each bucket is equal, and that an entry uses one cell for storage). Moreover, if each hash table of the hashing unit has an equal number of buckets and cells, the number of entries that can be stored by the hashing unit is H*C*B, where H is an integer value representing the number of hash tables in the hashing unit. In one example, H=4, B=8192, and C=2, such that the hashing unit can store 65,536 key value entries. Because the hash function for a hash table provides a direct mapping to a bucket of the hash table, the time to discover a cell storing a particular key value is O(H*C), where O(x) refers to big-oh timing function notation. In other examples, all cells are searched concurrently, which may allow discovery of an appropriate cell in approximately constant time.

When adding a value to the hash table, the hashing unit stores the key value and an associated value in one of the cells of the bucket mapped to the key value. For example, with respect to the FIB of router 12A, destination addresses (prefixes) act as key values, while associated values correspond to identifiers of network interfaces. Accordingly, router 12A stores a destination address or prefix and an associated identifier of a network interface in a cell of a bucket to which a hash function maps the destination address. By storing the destination address or prefix in the cell, if two or more destination addresses are mapped to the same bucket, router 12A can determine which of the cells stores the identifier of the network interface associated with a particular destination address.

As noted above, router 12A is capable of dynamically increasing or decreasing the hash space by activating or deactivating the hash tables. Therefore, the hashing unit includes a set of active hash tables and a set of inactive hash tables. Letting integer A represent the number of active hash tables and integer N represent the number of inactive hash tables, the size of the sets of active and inactive hash tables can be expressed as ($0 \leq A$, $N \leq H$) such that $A+N=H$, where H again represents the number of hash tables in the hashing unit.

Accordingly, router 12A at times determines that one of the set of inactive hash tables should be activated in order to increase an available hash space. This determination can be based on a variety of factors. In some examples, router 12A makes the determination based on the number of entries currently stored in the hash space exceeding a threshold. In some examples, router 12A makes the determination when adding a new key value to the hashing unit results in collisions with all cells of all buckets to which the new key value is mapped (i.e., no unused cell is available in any of the candidate buckets in the set of hash tables that are currently active). In any case, when router 12A determines that one of the inactive hash tables should be activated, router 12A can activate an inactive hash table to increase the available hash space. Router 12A then stores the new key value in the recently activated hash table.

In this manner, the hashing unit of router 12A provides the capability to store a relatively large number of key values, while providing flexibility in the number of physical components that are active at a given time. Router 12A need not provide power to some or all components associated with the inactive hash tables (such as, for example, hashing logic circuitry and/or physical storage units for storing key values). Therefore, the hashing unit of router 12A can have a large potential storage capacity, yet reduce power consumption when less than the full storage capacity is needed.

Though described primarily with respect to router 12A, it should be understood that the techniques of this disclosure may be implemented by any of routers 12, client device 14, server device 16, or any other computing device that would implement hashing functionality. Moreover, the hashing unit of this disclosure may be applied to other contexts and for other uses. For example, routers 12 may additionally or alternatively include one or more hashing units for implementing a Bloom filter. One example implementation of Bloom filters in network devices using hash tables is described in U.S. patent application Ser. No. 12/425,517, entitled "DYNAMIC LINK LOAD BALANCING," by Arun Kumar S P et al., filed Apr. 17, 2009, which is hereby incorporated by reference in its entirety.

In some examples, router 12A includes multiple hashing units to implement a Bloom filter. A Bloom filter is generally a data structure for storing an indication of whether a particular value has been stored (or been previously processed). The Bloom filter data structure is generally designed such that false negatives are avoided, while leaving open the (albeit small) possibility of false positives. That is, a well-designed Bloom filter can provide an indication of whether a particular value has not been stored, but in some cases may provide an incorrect indication that the value has been stored (when in fact, the value has not been stored).

In examples where router 12A includes a Bloom filter (which may be implemented using hashing units), when router 12A stores a key value in, e.g., the FIB, router 12A adds the key value to the Bloom filter. In general, when a Bloom filter is queried with a particular value, the Bloom filter provides an indication of whether the value is stored in the Bloom filter. While false positives are possible when using a Bloom filter, false negatives are typically not possible, due to the design of the Bloom filter. Therefore, upon receiving a key value comprising a destination address for a packet, router 12A first determines whether the key value is stored in the Bloom filter, and if so, determines whether the key value is actually available in forwarding information. Additional details regarding the use of Bloom filters to determine whether a key value is available in forwarding information is described in co-pending U.S. patent application entitled "DYNAMIC BYPASS MECHANISM TO ALLEVIATE BLOOM FILTER BANK CONTENTION," by Keen et al., filed Sep. 22, 2011, which is hereby incorporated by reference in its entirety.

Routers 12, in some examples, use hashing units to perform packet filtering, in addition or in the alternative to the use of hashing units to implement Bloom filters. In some examples, filters specify one or more conditions and a set of actions to be performed on packets that match the conditions. In various examples, the conditions specify one or more of a source Internet protocol (IP) address, a destination IP address, a source port, a destination port, a protocol, and/or other fields of a packet. Accordingly, a hashing unit in accordance with the techniques of this disclosure can be used to recognize any or all of the elements of a condition, e.g., the source IP address, destination IP address, source port, destination port, protocol, or other fields of a packet. The actions to perform when the hashing unit indicates that a packet satisfies the condition of a filter may include one or more of appending a label to the packet (for multiprotocol label switching (MPLS) to tunnel the packet), removing or swapping a label on the packet, inspecting the packet for viruses, performing deep packet inspection on the packet, performing quality of service processing on the packet (e.g., prioritizing the packet over other packets), blocking or dropping the packet (e.g., when the source or destination associated with the packet have been determined to be malicious) or other services.

Client device 14 and server device 16 may also include hashing units in accordance with the techniques of this disclosure. In some examples, server device 16 comprises a database server that uses a hashing unit to map input keys into storage locations. In some examples, client device 14 comprises a cellular phone that uses a hashing unit to store a contact list (e.g., including names, telephone numbers, e-mail addresses, or other information for contacts in the contact list). These and other computing devices may also use the hashing unit of this disclosure to provide hashing functionality having a dynamically adjustable capacity in order to reduce power consumption by physical hash tables.

The techniques of this disclosure may provide several advantages. For example, a hashing unit in accordance with this disclosure provides a relatively high capacity for key value storage. Additionally, the hashing unit provides a relative power savings over hash tables having a similar capacity, in that individual hash tables of the hashing unit of this disclosure can be powered on or off. In this manner, the hashing unit provides flexible configurability. A software-based controller can enable a set of hash tables of the hashing unit to provide sufficient capacity for key values of a particular application and disable the other hash tables. In this manner, the power consumed by the hashing unit of this disclosure is roughly proportional to the size of the set of key values stored by the hashing unit. Therefore, power consumption can be adjusted according to an application's requirements for hash storage capacity (also referred to in this disclosure as a hash space). In addition to reducing power consumption, when other data structures are stored in the same physical memory as a disabled hash table, these techniques may also reduce memory bandwidth and contention with other operations.

Figure 2:
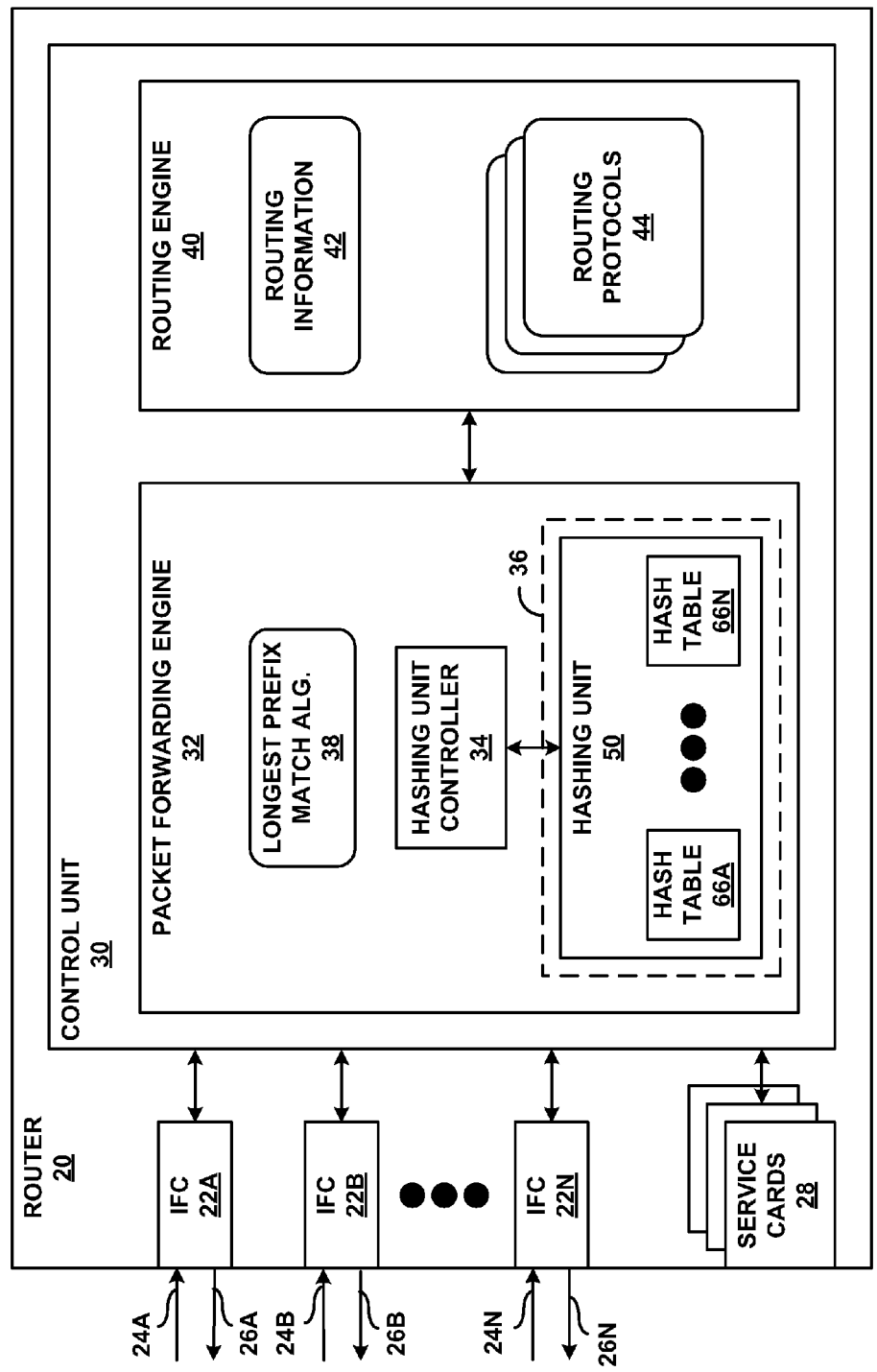
FIG. 2 is a block diagram illustrating an example router including a hashing unit that is configured according to the techniques of this disclosure.

FIG. 2 is a block diagram illustrating an example router 20 including hashing unit 50 that is configured according to the techniques of this disclosure. Router 20 may correspond to any one of routers 12 in FIG. 1, e.g., router 12A of FIG. 1. In the example of FIG. 2, router 20 includes interface cards 22A-22N (IFCs 22), service cards 28, and control unit 30. Control unit 30 includes packet forwarding engine (PFE) 32 and routing engine (RE) 40. PFE 32 includes instructions for a longest prefix match algorithm 38, a hashing unit controller 34, and hashing unit 50, which includes a plurality of physical, hardware-based hash tables 66A-66N (hash tables 66). RE 40 includes routing information 42 and instructions for a plurality of routing protocols 44.

In other examples, RE 40 executes software that conforms substantially to the functionality of hashing unit controller 34, e.g., to add entries to and/or remove entries from hashing unit 50, as explained below. In general, hashing unit controller 34 may be implemented as hardware or software, or a combination thereof. When implemented as software, control unit 30 also provides requisite hardware for storing and executing the software, such as memory and one or more processing units. As stated above, in some examples, routing engine 40 executes software instructions for performing all or a portion of the functionality of hashing unit controller 34.

IFCs 22 receive data via respective inbound links 24A-24N (inbound links 24) and send data via outbound links 26A-26N (outbound links 26). Inbound links 24 and outbound links 26 in some examples for common IFCs form common, physical communication media for the IFCs, which operate in full duplex mode. That is, in some examples, each of IFCs 22 are coupled to respective communication media that can send and receive data substantially simultaneously. In other examples, inbound links 24 and outbound links 26 form separate physical media for respective IFCs 22.

Control unit 30 includes processing hardware and, in some examples, software and/or firmware executed by the processing hardware. In various examples, control unit 30 and the various elements thereof, e.g., PFE 32 and RE 40, are implemented in one or more processors, processing units, digital signal processors (DSPs), application specific integrated circuits (ASICs), field programmable gate arrays (FPGAs), or any combination thereof. When implemented in software or firmware, control unit 30 includes one or more processors or processing units for executing instructions for the software or firmware, as well as a computer-readable storage medium for storing the instructions. In some examples, elements of PFE 32 and RE 40 are implemented in discrete units or modules, while in other examples, PFE 32 and RE 40 are functionally integrated.

RE 40 includes instructions for one or more routing protocols 44. Routing protocols 44 include any or all of interior gateway routing protocols such as open shortest path first (OSPF), intermediate system to intermediate system (IS-IS), routing information protocol (RIP), interior gateway routing protocol (IGRP), enhanced IGRP (EIGRP), and/or exterior gateway routing protocols, such as border gateway protocol (BGP). In general, interior gateway routing protocols are used to exchange routing information between routers of an autonomous system. When network 10 (FIG. 1) forms an autonomous system, routers 12 exchange routing information according to an interior gateway routing protocol. Routers at the edge of an autonomous system, such as routers 12A and 12E (FIG. 1) exchange routing information with routers of other autonomous systems (not shown) in accordance with exterior gateway routing protocols.

In general, RE 40 executes routing protocols 44 to collect routing information and select routes from router 20 to other network devices. That is, RE 40 provides an operating environment for one or more routing protocols that exchange messages to communicate routes and/or link information. When router 20 receives a communication from another router, RE 40 receives the communication and stores the information in routing information 42 (also referred to as a routing information base). RE 40 then performs path selection to select a path from router 20 to each destination or prefix.

The selected route to reach the destination generally includes an indication of a "next hop" along the route to reach the destination. This next hop typically corresponds to a network device, such as, for example, another router, switch, gateway, or other network device along the route to reach the destination. The next hop device is connected to router 20 via one of IFCs 22. Accordingly, using the selected route to reach a destination, control unit 30 can determine the one of IFCs 22 connected to the next hop along the route to the destination and update forwarding information stored by PFE 32 to indicate the one of IFCs 22 to which to send packets destined for the destination.

More specifically, PFE 32 maintains forwarding information base (FIB) 36. Then, in response to receiving information from routing engine 40, PFE 32 updates FIB 36 to map a destination address (typically a network prefix) to a logical or physical interface associated with one of IFCs 22 based on the next hop along the route to reach the destination address. In accordance with the techniques of this disclosure, PFE 32 stores FIB 36 in hashing unit 50, which includes one or more hardware-implemented hash tables 66. More particularly, next hop data for FIB 36, which may take the form of one or more radix trees, is stored in an available hash space of hashing unit 50 for high-speed access. A set of hash tables 66 are active at a given time, such that the storage space provided by the set of active hash tables forms the hash space of hashing unit 50.

Hashing unit controller 34 activates and deactivates hash tables 66 as necessary, e.g., based on the particular network environment and the number of FIB entries, to balance efficient storage of key values among hash tables 66 while also reducing the amount of power needed to operate hash tables 66. Hashing unit controller 34 determines whether an inactive one of hash tables 66 should be activated and whether an active one of hash tables 66 should be deactivated. In some examples, hashing unit controller 34 includes configuration data describing a threshold for an available hash space. For example, the threshold may correspond to a percentage of the available hash space currently in use.

The available hash space corresponds to the number of entries that can be stored by the active hash tables, while the available hash space currently in use corresponds to the number of entries actually stored in the available hash space. In some examples, when hashing unit controller 34 determines that the actual percentage of the available hash space in use exceeds the threshold, hashing unit controller 34 determines that an inactive one of hash tables 66 should be activated to increase the available hash space. In some examples, when hashing unit controller 34 receives a value that cannot be stored in the active hash tables, e.g., due to collisions, hashing unit controller 34 determines that an inactive one of hash tables 66 should be activated to increase the available hash space.

Accordingly, when PFE 32 receives an indication of a next hop to reach a network destination, PFE 32 stores an identifier for the network destination (e.g., an IP address of the network destination), along with an identifier for the one of IFCs 22 coupled to the next hop, to hashing unit 50. In some examples, hashing unit controller 34 provides an application programming interface (API) for PFE 32 and/or routing engine 40 to add data to, remove data from, and query data of hashing unit 50. In this manner, PFE 32 and/or routing engine 40 can add a new destination address, and an identifier for the corresponding one of IFCs 22, to FIB 36, stored in hashing unit 50. In some examples, PFE 32 sends the destination address and IFC identifier to hashing unit controller 34, which treats the destination address as a key value to be stored in an active one of hash tables 66. In some examples, hashing unit 50 provides both hardware and software interfaces for either or both of PFE 32 and routing engine 40. In one example, management software executing on routing engine 40 adds entries to and removes entries from hashing unit 50, while hardware elements of control unit 30 perform lookup operations within hashing unit 50.

In some examples, software executed by routing engine 40 adds keys to hashing unit 50 and/or removes keys from hashing unit 50. With respect to the example of FIG. 2, hashing unit controller 34 determines whether the new key value can be stored in a currently active one of hash tables 66. For example, hashing unit controller 34 determines whether hashing functions for active ones of hash tables 66 map the new key value to a bucket including an empty cell. If there exists at least one empty cell of a bucket of one of an active one of hash tables 66 to which the hash functions map the key value, hashing unit controller 34 stores the key value, and corresponding IFC identifier, to the empty cell. On the other hand, if none of the active hash tables can store the new key value, hashing unit controller 34 activates an inactive hash table and stores the new key value and corresponding IFC identifier to a cell of a bucket to which a hash function for the recently activated hash table maps the key value.

In this manner, when one of IFCs 22 receives a packet, the one of IFCs 22 passes the packet to PFE 32. PFE 32 performs a lookup by querying hashing unit 50 using hashing unit controller 34 with a destination address or other keying information (e.g, MPLS header or VLAN tag) of the received packet, assuming that the destination address is an address other than the address of router 20. Hashing unit controller 34 sends the destination address as a key value to hashing unit 50 to determine a cell of a bucket of an active one of hash tables 66 and to return a next hop identifier for a physical or logical output interface to which to send the received packet. In some examples, PFE 32 executes longest prefix match algorithm 38 using the destination address of the packet and the entries of active hash tables of hashing unit 50. Accordingly, the one of output interfaces to which PFE 32 sends the packet may correspond to the interface associated with the longest prefix match for the specific destination address of the received packet.

In some examples, PFE 32 additionally stores a prefix length table. The prefix length table stores all different prefix lengths (corresponding to prefixes of network addresses and network address masks) that are stored in hashing unit 50. That is, the prefix length table stores a set of prefix lengths for a longest prefix match key. The prefix length indicates the number of upper bits of a mask-able key that should be used in comparison with a hash table prefix. As an example, a prefix length of /128 means that all 128 bits of a mask-able key should be used in comparison with a hash table prefix. A prefix length of /64 means that the upper 64 bits of a mask-able key should be used in comparison with a hash table prefix.

When present, the prefix length table is used for keys that require a longest prefix match. The prefix length table data structure can be stored in a random access memory, such as static random access memory (SRAM). In some examples, the prefix length table includes 4K entries.

At times, RE 40 determines that a route is either no longer available or is no longer the best route to reach a destination address. For example, RE 40 may determine that a link or a device along a selected route has failed, or that a new route has been discovered that is determined to be better for reaching a destination than a previously selected route. In any case, RE 40 may send information to PFE 32 to cause PFE 32 to remove data from FIB 36. In some examples, hashing unit controller 34 determines that hashing unit 50 is storing less than a threshold amount (or percentage) of data, prompting hashing unit controller 34 to attempt to disable one or more of the active hash tables of hashing unit 50. The threshold for disabling an active hash table may be different than the threshold for activating an inactive hash table.

Prior to disabling an active hash table, hashing unit controller 34 determines whether disabling the active hash table is feasible. In particular, hashing unit controller 34 determines whether all of the entries of at least one hash table to be disabled can be migrated to the remaining hash tables. If so, hashing unit controller 34 transfers all of the entries stored by the active hash table to the remaining hash tables, then disables the active hash table.

In some examples, FIB 36 maps a destination address (and/or a source address) to one or more of service cards 28. For example, FIB 36 may map a source domain and/or a destination domain to one of service cards 28 that performs virus detection or other malware detection services. As another example, FIB 36 may map a source and/or destination address to one of service cards 28 that performs a tunneling service, such as appending or swapping a label associated with a tunnel to the packet. Accordingly, PFE 32 in some examples filters fields of a received packet to determine one or more services to apply to the packet prior to forwarding the packet. After receiving the packet from service cards 28 (after services have completed), PFE 32 determines the one of IFCs 22 to which to send the serviced packet, based on data of FIB 36.

Figure 3:
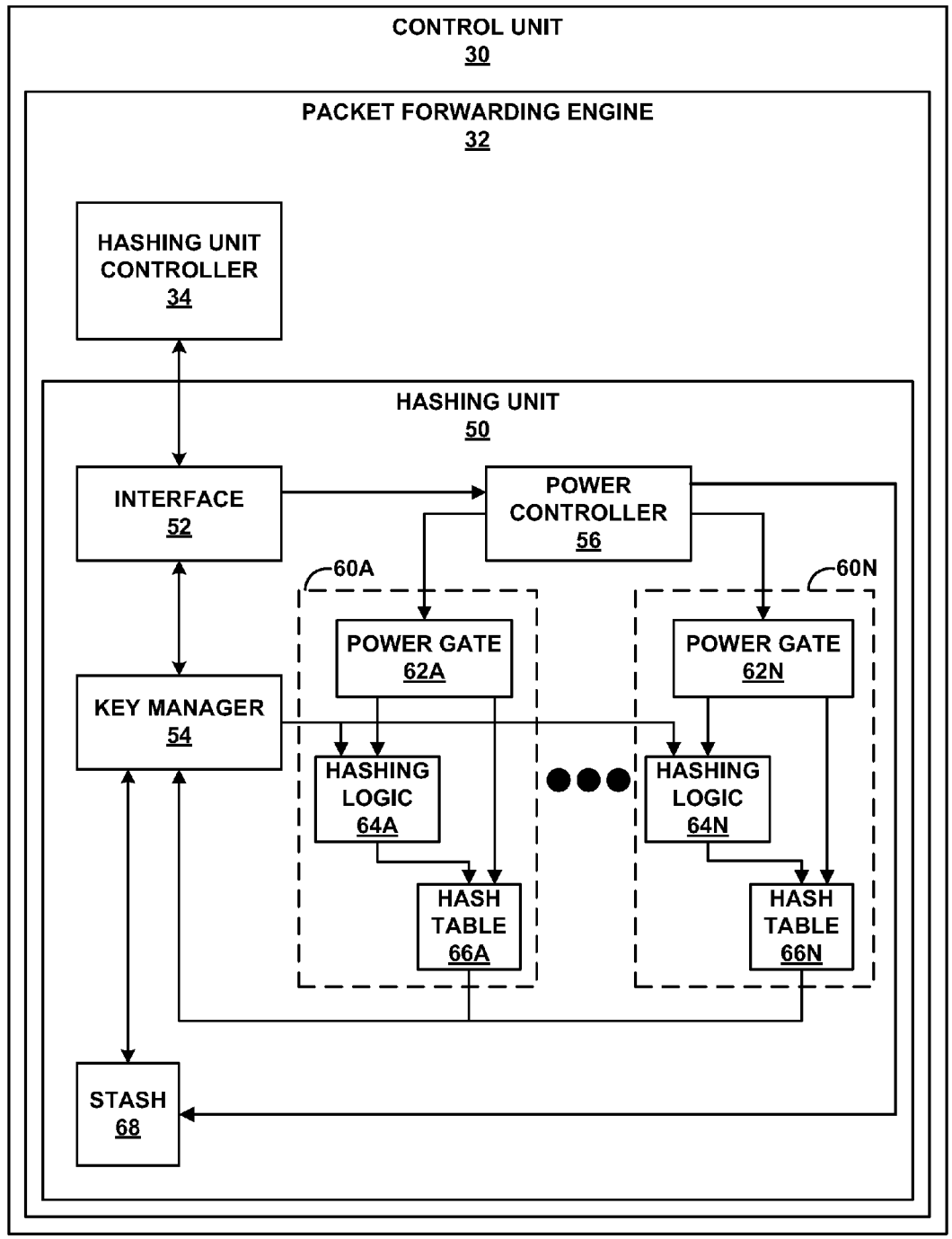
FIG. 3 is a block diagram illustrating a hashing unit of a router in greater detail.

FIG. 3 is a block diagram illustrating an example embodiment of hashing unit 50 of router 20 (FIG. 2) in greater detail. Elements of FIG. 3 that are similarly named and numbered to elements of FIG. 2 conform substantially to the similarly named and numbered counterparts of FIG. 2. In the example of FIG. 3, hashing unit 50 includes interface 52, key manager 54, power controller 56, stash 68, and a plurality of sub-hashing units 60A-60N (sub-hashing units 60). Each of sub-hashing units 60 includes a respective one of power gates 62A-62N (power gates 62), hashing logics 64A-64N (hashing logics 64), and hash tables 66. Again, it should be understood that in some examples, hashing unit controller 34 corresponds to a unit separate from packet forwarding engine 32, e.g., a software module executed by RE 40 (FIG. 2). For purposes of example, hashing unit controller 34 is illustrated as a component of PFE 32.

In the example of FIG. 3, sub-hashing unit 60A includes power gate 62A, hashing logic 64A, and hash table 66A. Hashing logic 64A represents a circuit for executing a hash function for sub-hash unit 60A. Hash functions for each of sub-hash units 60 are generally unique, such that, for a given key value, each of the hash functions for sub-hash units 60 map the key value to a different bucket within the hash table of the corresponding sub-hash unit. Hashing logic 64A may be implemented as dedicated hardware for the hash function, or as software executed by a hardware-based processing unit.

In one example, hash table 66A is stored in random access memory (RAM), such as static RAM (SRAM) or dynamic RAM (DRAM). In some examples, each of hash tables 66 is stored in a respective memory range of a RAM module. In such examples, power gate 62A can turn off power to hashing logic 64A to disable hash table 66A. In other examples, each of hash tables 66 is stored in a different RAM module, such that power gate 62A can turn off power to the RAM module for hash table 66A when hash table 66A is disabled. Hashing logic 64A maps key values to memory addresses within the RAM module (or portion thereof) for hash table 66A. Other power gates 62, hashing logics 64, and hash tables 66 conform substantially to power gate 62A, hashing logic 64A, and hash table 66A, respectively.

In this manner, power gates 62 for sub-hashing units 60 can activate hash tables 66 by powering on hashing logic circuitry for hash tables 66 and/or storage media for hash tables 66. Likewise, power gates 62 for sub-hashing units 60 can deactivate (or disable) hash tables by powering off hashing logic circuitry for hash tables 66 and/or storage media for hash tables 66. Accordingly, logic circuitry and/or memory modules for inactive hash tables do not draw power when hashing unit 50 is performing operations for active hash tables.

Hash tables 66 generally represent a collection of separate, physical (that is, hardware-based) hash tables that maintain a set of key values. In the example of FIG. 3, the key values correspond to network addresses (or network masks). In other examples, however, the key values correspond to other unique identifiers that can act as input to hash functions. Contents of active ones of hash tables 66 constitute an entire set of data stored by hashing unit 50, while the available storage space of the active hash tables constitutes an available hash space. Any particular key value can reside in any of the active hash tables. In accordance with the techniques of this disclosure, hashing unit controller 34 can enable any or all of sub-hashing units 60, such that the enabled sub-hashing units provide sufficient capacity for a set of key values to be maintained. Likewise, hashing unit controller 34 can disable other sub-hashing units 60 not needed to store the set of key values to be maintained.

Because the disabled sub-hashing units do not need to perform operations associated with hashing (e.g., searching for a key value used to query hashing unit 50), respective hashing logics 64 of disabled sub-hashing units can be powered off by power controller 56 via respective power gates 62, at the direction of hashing unit controller 34. In some examples, memory modules for hash tables 66 can also be powered off by power controller 56 via respective power gates 62, at the direction of hashing unit controller 34. In this manner, hashing unit 50 consumes less power than a single, physical hash table that has the combined storage capacity of hash tables 66. Likewise, hashing unit 50 provides a higher storage capacity than a single hash table the size of one of hash tables 66, in that any or all of hash tables 66 can be activated.

Alternatively, logical gates can prevent certain ones of hashing logics 64 and hash tables 66 from operating when a respective one of sub-hashing units 60 is disabled. Thus, although the respective hashing logic 64 and hash table 66 may remain powered, they may avoid drawing power by not processing data when disabled.

Key manager 54 stores key values to hash tables 66, deletes key values from hash tables 66, queries hash tables 66 using a key value to retrieve data associated with the key value, and migrates data from a hash table to be deactivated to remaining, active hash tables. In some examples, e.g., when all of hash tables 66 are currently active yet a new key value cannot be stored in any of hash tables 66, key manager 54 stores the new key value to stash 68. Stash 68 generally corresponds to a portion of memory separate from that for hash tables 66. In general, key manager 54 stores key values for which there exist unresolvable collisions to stash 68. The size of stash 68 typically remains fixed, and key manager 54 searches all cells in stash 68 for a key value (or empty cell to add a key value), rather than using a hash function. In other words, an entry for any key value can be placed in any cell in stash 68, without the use of a hash function. In some examples, when stash 68 is unused (e.g., no data is stored to stash 68), power controller 56 disables power to stash 68.

In the example of FIG. 3, key values correspond to destination network addresses (or prefixes thereof, in some examples). Cells of hash tables 66 currently storing key values generally store the key values mapped to the cells, as well as information indicative of an output interface (e.g., one of IFCs 22) through which packets destined for the destination address are to be sent. In some examples, each cell stores 128 bits of data, where the first 64 bits correspond to a mask entry corresponding to a mask key value, the next 24 bits store a non-mask entry corresponding to a constant portion of a key value that are not masked by a prefix length, the next 8 bits store a prefix length value that represents the prefix length associated with the mask key value, and the remaining 32 bits store an explicit result that is passed when a key value matches the entry. Table 1 below provides an example arrangement of data in a cell of hash tables 66.

TABLE 1

| Field Name | Field Size | Field Description |
| --- | --- | --- |
| Mask-entry | 64 | A cell has up to 64 bits of mask key. |
| Non-mask entry | Parameter | This is the constant part of the key which is not masked by the prefix length. |
| Prefix Length | 8 | This field stores the prefix length associated with the mask key. |
| Explicit Result | Parameter | This field stores the explicit result that is passed if the key matches to this entry. |

In some examples, buckets of hash tables 66 include two cells, cell 0 and cell 1. Hashing unit controller 34 sends commands to key manager 54 to manage data for cells of hash tables 66 to indicate whether the cells contain valid or invalid data. In some examples, hashing unit controller 34 causes key manager 54 to store data as a double cell, that is, data that forms a single logical unit but that occupies two cells, which may be two cells in the same bucket or cells of different buckets. In some examples, hashing unit controller 34 causes key manager 54 to manage cells of buckets of hash tables 66 such that each bucket having two cells has one of the following states:
1. Cell 1: INVLD, Cell 0: INVLD=>Both cells in the bucket have invalid cells. This bucket should not match to any key.

2. Cell 1: SCELL (X), Cell 0: INVLD=>Cell 1 has single cell X. Cell 0 has invalid cell. This bucket should match key for single cell X.
3. Cell 1: INVLD, Cell 0: SCELL (Y)=>Cell 1 has invalid cell. Cell 0 has single cell Y. This bucket should match key for single cell Y.
4. Cell 1: SCELL (X), Cell 0: SCELL (Y)=>Cell 1 has single cell X. Cell 0 has single cell Y. This bucket should match key for single cell X and key for single cell Y. This bucket will not match key for double cells.
5. Cell 1: INVLD, Cell 0: DCELL_LO (A)=>Cell 1 has invalid cell. Cell 0 has double cell A low part. This bucket should not match to any key.
6. Cell 1: DCELL_HI (A), Cell 0: DCELL_LO (A)=>Cell 1 has double cell A high part. Cell 0 has double cell A low part. This bucket should match key for double cell A. This bucket should not match to any key for single cell.
7. Cell 1: DCELL_HI (A), Cell 0: SCELL (X)=>Bucket can reach this state because a single cell is written into cell 0 of the bucket. This bucket should match to single cell X. This bucket should not match to any double cell.
8. Cell 1: SCELL (Y), Cell 0: DCELL_LO (B)=>Bucket can reach this state because a single cell is written into cell 1 of the bucket. This bucket should match to single cell Y. This bucket should not match to any double cell.
9. Cell 1: DCELL_HI(A), Cell 0: INVLD
10. Cell 1: DCELL_HI(A), Cell 0: DCELL_LO(B) where A and B are for different entries (e.g., they have unequal prefix lengths).

In some cases, it is possible that the same cell exists in more than one of hash tables 66, e.g., due to cell replacement. Hashing unit controller 34 is configured to monitor data of hash tables 66 such that this is a temporary state of hash tables 66. In this manner, hashing unit controller 34 ensures that a cell exists at one location only in a final (stable) state of hash tables 66. When multiple copies of a cell are stored in hash tables 66, key manager 54 can choose results from any copy of the cell. Accordingly, hashing unit controller 34 is configured to ensure that if a cell exists at more than one location in hash tables 66, all locations have the same result.

Interface 52 receives various commands from hashing unit controller 34. For example, interface 52 receives commands to determine whether a key value can be added to an active hash table, add a key value to hashing unit 50, delete a key value from hashing unit 50, provide data associated with a key value as stored by hashing unit 50, activate an inactive one of hash tables 66, and/or disable an active one of hash tables 66. In response to commands to activate or deactivate ones of hash tables 66, interface 52 provides a signal to power controller 56 to activate or deactivate sub-hashing units 60. In response to commands regarding adding, deleting, or querying hash tables 66 with a particular key value, interface 52 provides a signal to key manager 54 to perform the add, delete, or query command, receives a result (if any) from key manager 54, and returns the received result to hashing unit controller 34. Hashing unit controller 34, in turn, provides information for the returned result to PFE 32.

In accordance with the techniques of this disclosure, hashing unit controller 34 can dynamically increase and decrease available hash space. When hashing unit controller 34 receives a new key value to be stored to hashing unit 50, but cannot easily store the new key value (e.g., due to collisions or due to the filled entries of the hash space exceeding a threshold), hashing unit controller 34 sends a command to power controller 56, via interface 52, to activate an inactive one of sub-hashing units 60. Hashing unit controller 34 then sends a command to key manager 54 to add the new key value to the recently activated one of sub-hashing units 60. Key manager 54 adds the new key value by sending the key value to hashing logic of the recently activated sub-hashing unit to determine a bucket of the hash table to which the key value is mapped by the hash function implemented by the hashing logic. Key manager 54 stores the key value, as well as data associated with the key value, to a cell of the bucket of the hash table. When hashing unit controller 34 subsequently searches hashing unit 50 for a key value, the search will cover all active hash tables of hashing unit 50.

In some examples, key values stored by hash tables 66 correspond to prefix lengths, that is, prefixes of network addresses. Each of hash tables 66, in some examples, implement Panigrahy hashing, which is a generalization of cuckoo hashing. The concept of cuckoo hashing uses two hash functions to ensure that a key can always be looked up with a maximum of two accesses in a hash table by using two different hash functions. The theory of balanced allocations says that using two hash functions instead of a single hash function should improve the load of the largest bucket in the hash table dramatically, e.g., from $O(\log n)$ to $O(\log \log n)$ with high probability.

Cuckoo hashing uses a hash table with hash functions h1 and h2 and one cell per bucket. A cell is defined as a place for a (key, value) pair in the hash table. Specifically, when hashing a new key x, hashing unit controller 34 checks whether the bucket h1(x) is occupied. If the bucket is empty, hashing unit controller 34 inserts x at h1(x). If h1(x) is occupied by some other key y, hashing unit controller 34 may still insert x at h1(x) but displace y by relocating it to h2(y). If h2(y) is empty, hashing unit controller 34 inserts y at h2(y). If h2(y) is occupied by yet another key z, hashing unit controller 34 displaces z by relocating it to h1(z). Cuckoo hashing thus undergoes a cascade of relocations during key insertion that alternate between h1 and h2 until an empty bucket is found.

In some examples, rather using only one cell per bucket as in the original cuckoo hashing algorithm, hash tables 66 implement 2 cells per bucket. Hashing unit 50, in some examples, implements four hash functions, rather than two hash functions as proposed by cuckoo hashing. The insertion of keys in the hash table is framed as a "bread-first-search graph algorithm" or "random walk" algorithm. A stash (content-addressable memory, or CAM) of 4 buckets and 2 cells per bucket, e.g., stash 68, is supported with the structure of hash tables 66, in some examples. Stash 68 can store 8 single cells or 4 double cells, in some examples. Stash 68 is organized as 4 buckets deep and 2 cells per entry, in these examples. The prefixes with prefix length /0 to /64 occupy a single cell in stash 68. The prefixes with prefix length /65 to /128 take two cells within one bucket in stash 68. Stash 68's cell format may be same as the cell format of hash tables 66. Stash 68 may help in rare "key insertion" failure due to a cycle in hash tables 66, in some examples.

In some examples, during key lookup, the key value is compared to up to 8 cells of hash tables 66 (assuming four hash tables 66 and two cells per bucket in each of the hash tables) and 8 cells in stash 68. If the key matches with one of the cells of hash tables 66 or a cell of stash 68, the corresponding result is sent with the "match" bit set to hashing unit controller 34. In some examples, one key can exist at multiple places (different hash tables or stash) at the same time, e.g., due to the cell replacement nature of cuckoo hashing.

While FIG. 3 provides an example implementation of hashing unit 50 in router 20, it should be understood that other devices can also implement a hashing unit similar to hashing unit 50 in accordance with the techniques of this disclosure. As discussed above, physical hash tables can provide advantages in mobile devices, user endpoint devices, server devices, or in other contexts. In general, hashing unit 50 can be used anywhere a conventional hash table (whether implemented in hardware or software) would be used. Moreover, the techniques of this disclosure are generally applicable when power consumed by a storage unit is generally proportional to the amount of data to be stored in the storage unit.

Figure 4:
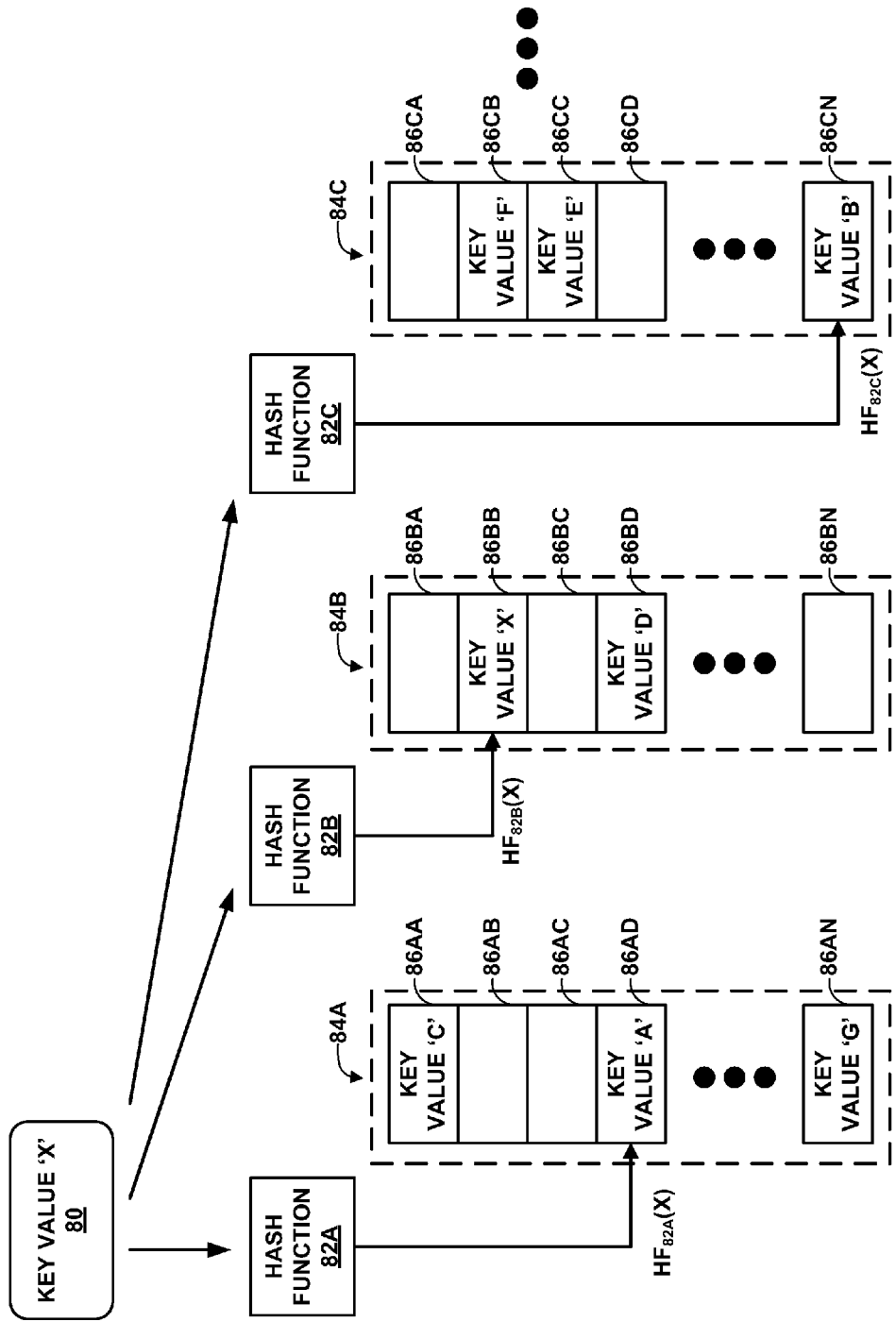
FIG. 4 is a conceptual diagram illustrating example hash functions applied to a key value 'X.'

FIG. 4 is a conceptual diagram illustrating example hash functions 82A-82C applied to a key value 'X' 80. In the example of FIG. 4, hash functions 82A-82C correspond to respective hash tables 82A-82C. Hash functions 82A-82C are implemented such that the outputs of hash functions 82A-82C differ when hash functions 82A-82C are applied to the same key value, e.g., key value 'X' 80. As illustrated by the ellipses to the right of hash table 84C, additional hash tables may also be present, and if so, are associated with other respective hash functions.

In the example of FIG. 4, hash table 84A includes buckets 86AA-86AN, hash table 84B includes buckets 86BA-86BN, and hash table 84C includes buckets 86CA-86CN. The buckets of hash tables 84A-84C are generally referred to as buckets 86. Buckets 86 of active hash tables 82A-82C can be empty (e.g., invalid) or include key values. In the example of FIG. 4, bucket 86AA stores data for key value 'C,' bucket 86AD stores data for key value 'A,' bucket 86AN stores data for key value 'G,' bucket 86BB stores data for key value 'X,' bucket 86BD stores data for key value 'D,' bucket 86CB stores data for key value 'F,' bucket 86CC stores data for key value 'E,' and bucket 86CN stores data for key value 'B.' Buckets 86 without a key value are considered invalid, that is, to not store data for a key value, in this example.

As noted above, hash functions 82A-82C are configured to produce different output values for the same input. In the example of FIG. 4, key value 'X' 80 acts as input to each of hash functions 82A-82C. In this example, hash function 82A maps key value 'X' 80 to bucket 86AD, hash function 82B maps key value 'X' 80 to bucket 86BB, and hash function 82C maps key value 'X' 80 to bucket 86CN. Bucket 86AD, however, stores data for key value 'A,' including key value 'A' itself, while bucket 86CN stores data for key value 'B,' including key value 'T' itself. In this manner, buckets 86AD and 86CN can be determined not to store data associated with key value 'X' 80. Bucket 86BB, on the other hand, stores data for key value 'X,' including key value 'X' itself. Therefore, querying each of hash tables 84A-84C with key value 'X' 80 yields the data stored in bucket 86BB.

In accordance with the techniques of this disclosure, hashing logic that executes hashing functions 82A-82C can be independently powered on or off. Likewise, memory modules for hash tables 84A-84C can be independently powered on or off. In this manner, the storage capacity (hash space) of active ones of hash tables 84 A-84C can be dynamically adjusted, such that power consumption is generally proportional to the needed amount of storage capacity. Moreover, in this manner, separate hash functions for separate physical hash tables can be applied to the same key value, resulting in different outcomes, yet the entry data associated with the key value can be retrieved for the key value. In this manner, separate physical hash tables can form a unified, common hash space. That is, using these techniques, separate physical hash tables can contribute to a common hash storage capacity.

Figure 5:
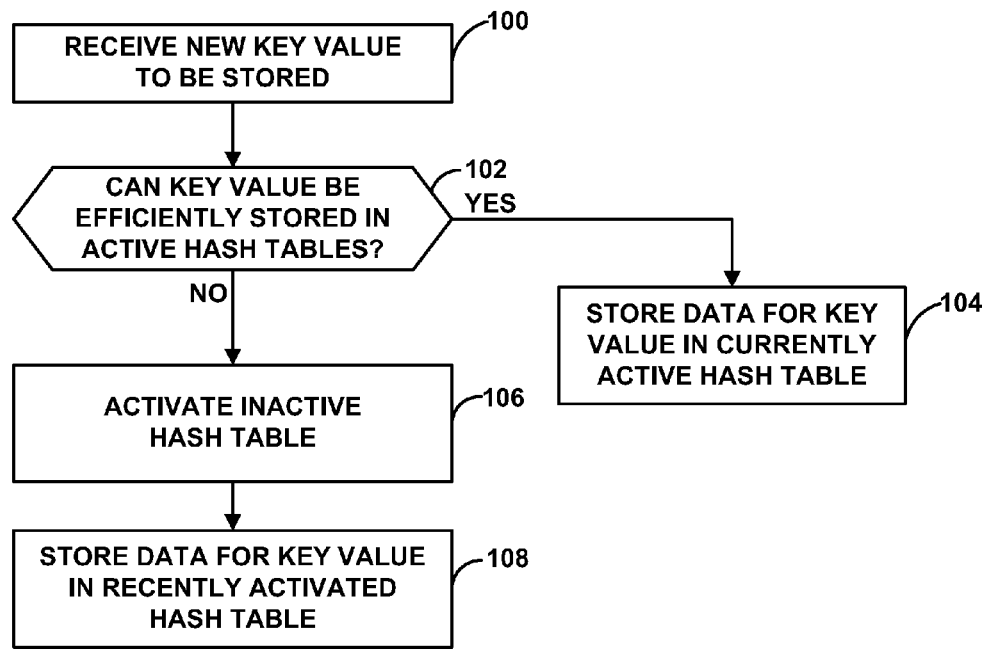
FIG. 5 is a flowchart illustrating an example method for storing a new key value to a hashing unit.

FIG. 5 is a flowchart illustrating an example method for storing a new key value to a hashing unit, such as hashing unit 50 (FIG. 3). Although described with respect to components of router 20 (FIGS. 2 and 3) for purposes of example and explanation, it should be understood that the method of FIG. 5 can be performed by any hashing unit controller for a hashing unit having a plurality of hash tables that can be individually enabled and disabled.

Initially, hashing unit controller 34 receives a new key value to be stored in hashing unit 50 (100). With respect to the examples of FIGS. 2 and 3, the new key value corresponds to a network destination address or network address prefix. Hashing unit controller 34 then determines whether the key value can be efficiently stored in active hash tables of hash tables 66 (102). In one example, hashing unit controller 34 determines whether the new key value results in a collision with all cells of all buckets of all active hash tables to which the new key value is mapped. In another example, hashing unit controller 34 determines whether the amount of data currently stored in the active hash tables exceeds a threshold for the number of hash tables that are currently active.

When hashing unit controller 34 determines that the key value can be efficiently stored in one of the currently active hash tables ("YES" branch of 102), hashing unit controller 34 stores data for the new key value in a currently active hash table (104). In particular, hashing unit controller 34 stores the key value itself (e.g., a destination address) as well as data to which the key value corresponds (e.g., an indication of one of IFCs 22 to which to send a packet having the destination address) in one of the currently active hash tables. Hashing unit controller 34 causes key manager 54 to send the key value to hashing logics of the active hash tables to determine buckets to which the key value is mapped. Hashing unit controller 34 then determines an empty (invalid) cell of one of the buckets to which the key value is mapped and stores the data for the key value to the determined empty cell.

On the other hand, when hashing unit controller 34 determines that the key value cannot be efficiently stored in one of the currently active hash tables ("NO" branch of 102), e.g., due to too many collisions or the amount of data stored by the active hash tables exceeding the threshold, hashing unit controller 34 activates an inactive hash table (106). In the example of FIG. 3, hashing unit controller 34 causes power controller 56 to send power to the power gate for the inactive hash table. The power gate, in turn, provides power to the hashing logic circuitry and the hash table (assuming power can be independently gated to both the hashing logic circuitry and memory module storing the hash table). In other examples, such as when the hash table data is stored in a shared memory module, the power gate provides power only to the hashing logic circuitry, as the shared memory module receives power independently from the power gate.

After powering on the hashing logic circuit and/or the memory module, hashing unit controller 34 stores data for the key value in the recently activated hash table (108). In particular, hashing unit controller 34 stores the key value itself (e.g., a destination address) as well as data to which the key value corresponds (e.g., an indication of one of IFCs 22 to which to send a packet having the destination address) in the recently activated hash table. Hashing unit controller 34 causes key manager 54 to send the key value to hashing logic for the recently activated hash table to determine a bucket of the recently activated hash table to which the key value is mapped. Hashing unit controller 34 then stores the data for the key value to a cell of the bucket.

Figure 6:
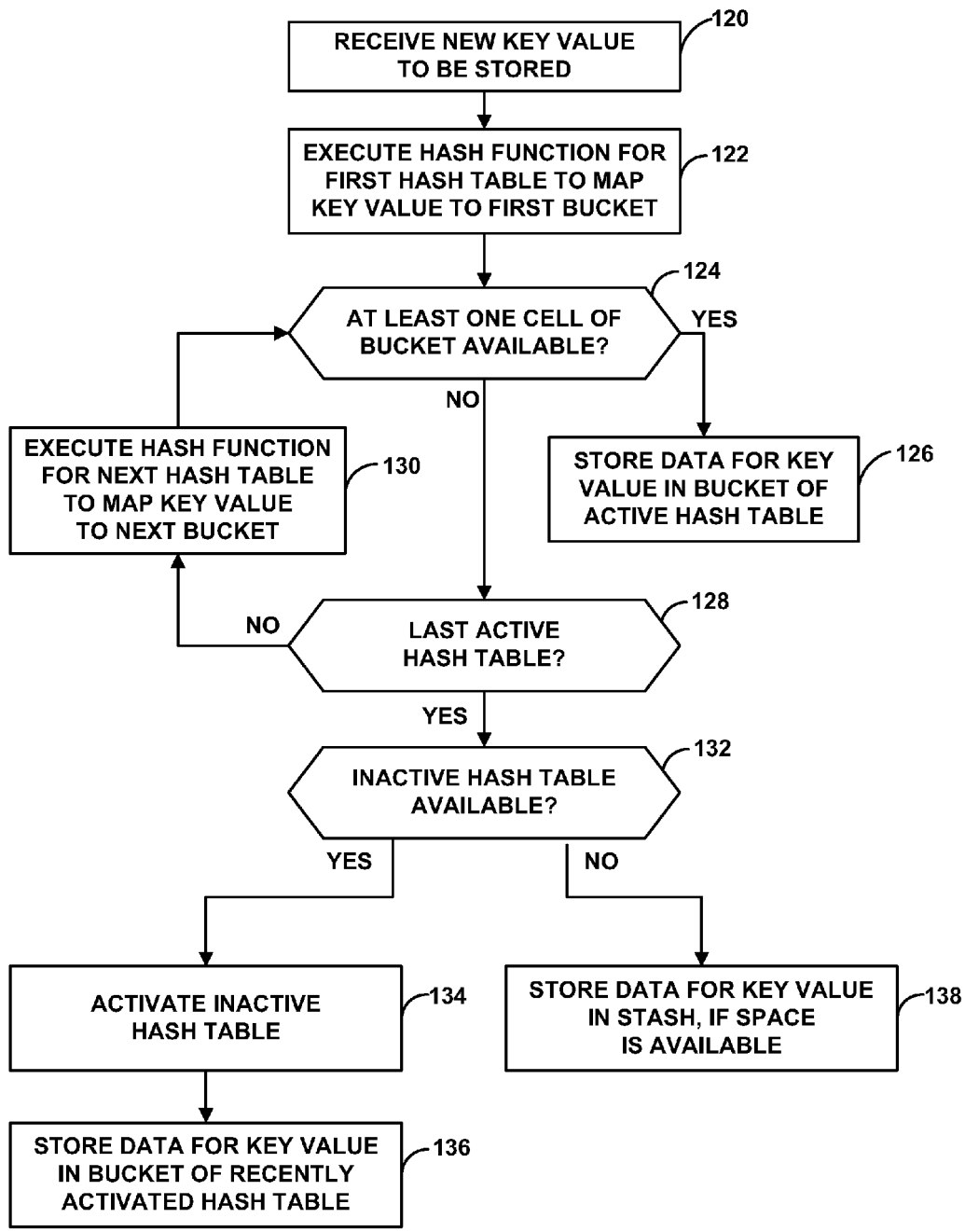
FIG. 6 is a flowchart illustrating an example method for storing a new key value to a hashing unit in greater detail.

FIG. 6 is a flowchart illustrating an example method for storing a new key value to a hashing unit, such as hashing unit 50 (FIG. 3), in greater detail. Although described with respect to components of router 20 (FIGS. 2 and 3) for purposes of example and explanation, it should be understood that the method of FIG. 6 can be performed by any hashing unit controller for a hashing unit having a plurality of hash tables that can be individually enabled and disabled. Moreover, use of numeric identifiers, such as "first," should be understood in a nominal sense, rather than an ordinal sense. That is, the designation of "first" should be understood to refer to an arbitrary element in a set of similar elements, rather than as the ordinal first element in the set.

Initially, hashing unit controller 34 receives a new key value to be stored in hashing unit 50 (120). In particular, hashing unit controller 34 receives the key value, as well as data associated with the key value. In the example of FIGS. 2 and 3, the key value corresponds to a destination network address (or address prefix), and the data associated with the key value corresponds to information describing an output interface (such as one of IFCs 22) to which to send packets specifying the destination network address of the key value.

After receiving the new key value, hashing unit controller 34 executes a hash function for a first hash table to map the key value to a first bucket (122). In this manner, hashing unit controller 34 determines a bucket of a first hash table (e.g., hash table 66A) to which the new key value is mapped. For example, hashing unit controller 34 causes hashing logic 64A to execute a hash function, treating the new key value as input to the hash function executed by hashing logic 64A. Hashing logic 64A produces a result indicative of a bucket of hash table 66A after executing the hash function on the new key value.

In some examples, the result corresponds to an indication of a memory address of hash table 66A. The memory address corresponds to a memory address within a memory module storing data for each of hash tables 66, and in particular, within a memory space allocated to hash table 66A. Thus, the memory address may correspond to a global memory address within the memory module, or a relative offset from the address of the memory module corresponding to the beginning of hash table 66A. In other examples, in which hash table 66A is stored in a separate, dedicated memory module, the memory address may correspond to an actual memory address of the memory module.

Hashing unit controller 34 then determines whether at least one cell of the bucket is available (124). That is, hashing unit controller 34 determines whether there is at least one cell in the bucket that is not currently storing a key value (e.g., is marked as including invalid data). If there is at least one cell of the bucket that is available ("YES" branch of 124), hashing unit controller 34 stores the new key value in the bucket of the hash table (126). Otherwise ("NO" branch of 124), hashing unit controller 34 determines whether the previously checked active hash table is the last active hash table (128).

If there is at least one active hash table remaining ("NO" branch of 128), hashing unit controller 34 executes a hash function for a next hash table to map the key value to a next bucket (130). In this manner, hashing unit controller 34 determines a bucket of a next one of the active hash tables to which the new key value is mapped. Hashing unit controller 34 then determines whether a cell of the determined bucket is available (124). This process continues either until an available cell of a bucket to which the key value is mapped is found or until no more active hash tables are available. Although described as a sequential analysis of the active hash tables, it should be understood that in some examples, hashing logic for active hash tables execute respective hash functions in parallel (e.g., substantially simultaneously). When executed in parallel, the hashing logic also provides results for the hash functions applied to the new key value to key manager 54 at substantially the same time. Hardware elements of control unit 30 may be configured to perform substantially similar steps to those described with respect to FIG. 6 in parallel for each active hash table. In this manner, the hardware elements may concurrently search all active hash tables, rather than performing a sequential search.

After all active hash tables have been checked to determine whether a cell is available for a bucket to which the new key value is mapped, without discovering an available cell ("YES" branch of 128), hashing unit controller 34 determines whether there is at least one inactive hash table of hashing unit 50 (132). If there is an inactive hash table in hashing unit 50 ("YES" branch of 132), hashing unit controller 34 activates the inactive hash table (134) and stores data for the new key value in a bucket of the recently activated hash table (136). On the other hand, if there is not an inactive hash table, e.g., because all of the hash tables of hashing unit 50 were already active, hashing unit controller 34 would attempt to store the new key value to stash 68 (138). For example, hashing unit controller 34 could store the new key value in a next available cell of stash 68. In cases where the stash has no empty cells available, hashing unit controller 34 may return an indication that the value currently cannot be stored. For example, if there is space available in the stash, hashing unit controller 34 may store the data for the key value, whereas if there is not space available, hashing unit controller 34 may return an indication of failure.

As an example, if hash table 66N were inactive and hashing unit controller 34 were to activate hash table 66N, hashing unit controller 34 would cause power controller 56 to enable power gate 62N. In turn, power gate 62N provides power to hashing logic 64N and hash table 66N. Then, hashing unit controller 34 determines a bucket of hash table 66N to which the new key value is mapped by causing hashing logic 64N to execute a corresponding hash function with the new key value as input. Hashing unit controller 34 could then store data for the new key value to a cell of the bucket to which the new key value is mapped.

Figure 7:
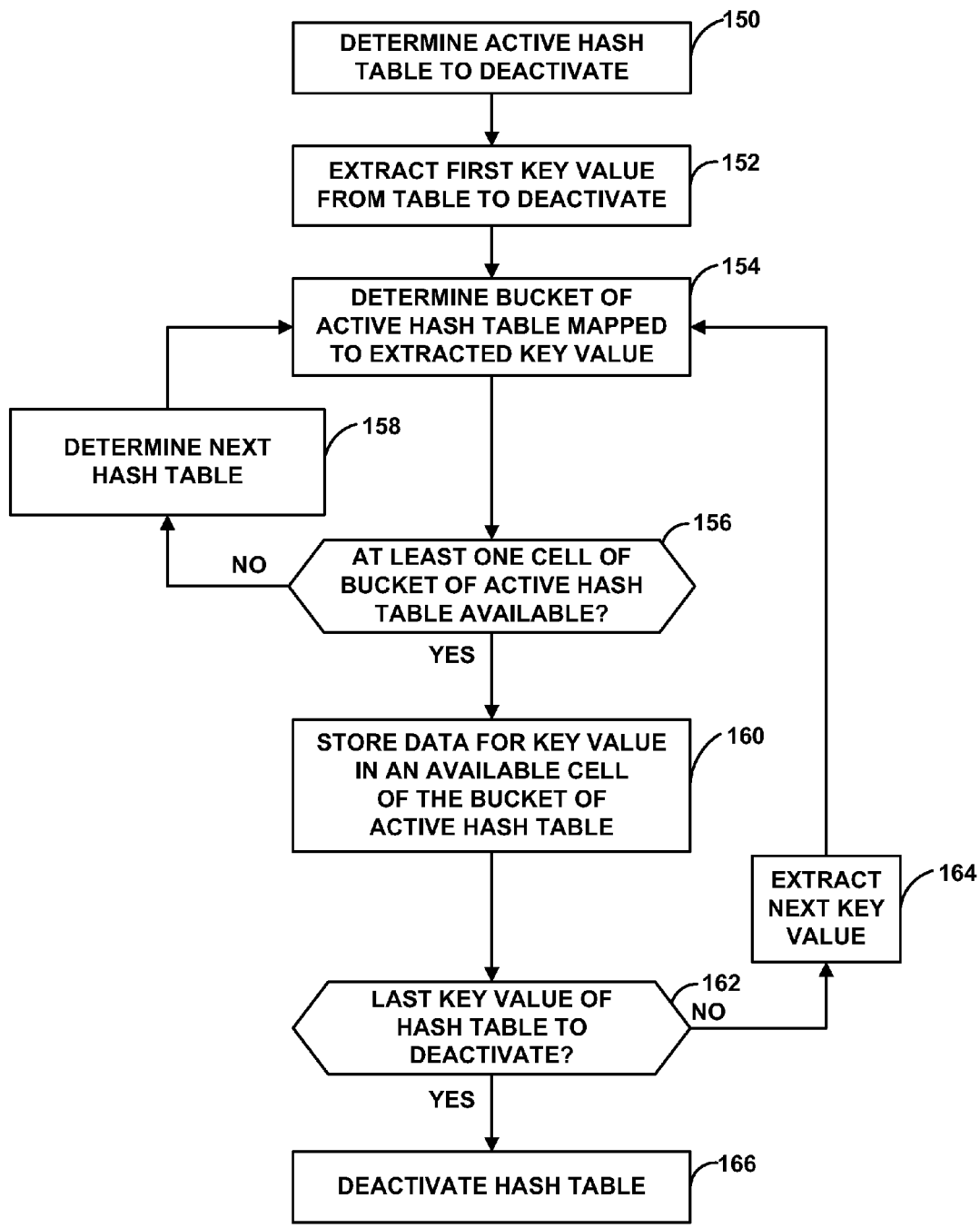
FIG. 7 is a flowchart illustrating an example method for deactivating a currently active hash table of a hashing unit.

FIG. 7 is a flowchart illustrating an example method for deactivating a currently active hash table of a hashing unit, such as hashing unit 50 (FIG. 3). Although described with respect to components of router 20 (FIGS. 2 and 3) for purposes of example and explanation, it should be understood that the method of FIG. 7 can be performed by any hashing unit controller for a hashing unit having a plurality of hash tables that can be individually enabled and disabled. Moreover, use of numeric identifiers, such as "first," should be understood in a nominal sense, rather than an ordinal sense. That is, the designation of "first" should be understood to refer to an arbitrary element in a set of similar elements, rather than as the ordinal first element in the set.

Initially, hashing unit controller 34 determines one of the active hash tables to deactivate (150). In some examples, hashing unit controller 34 first determines that the number of entries stored in the hash space provided by the active hash tables is below a threshold. In some examples, to determine one of the active hash tables to deactivate, hashing unit controller 34 determines one of the active hash tables that is currently storing the fewest key values. Hashing unit controller 34 also, in some examples, ensures that each entry currently stored in the hash table to be deactivated can be stored in the remaining active hash tables. In some examples, if a relatively small number of key values of the determined hash table cannot be stored in the remaining hash tables, e.g., due to collisions, hashing unit controller 34 stores these key values in stash 68.

In any case, after determining an active hash table to deactivate, hashing unit controller 34 extracts a first key value from the hash table chosen for deactivation (152). Hashing unit controller 34 then determines a bucket of one of the remaining active hash tables to which the extracted key value is mapped (154). That is, hashing unit controller 34 causes hashing logic for a first one of the active hash tables that are to remain active to execute the respective hash function using the extracted key value as input. Hashing unit controller 34 then determines whether there is at least one cell in the determined bucket of the first active hash table that is available to store the extracted key value (156).

If a cell is not available ("NO" branch of 156), hashing unit controller 34 determines a next available one of the active hash tables that are to remain active (158) and determines a bucket of the next active hash table to which the extracted key value is mapped (154). That is, hashing unit controller 34 causes hashing logic of the next hash table to determine a bucket by executing the respective hash function using the extracted key value as input. This continues until either an available cell is discovered ("YES" branch of 156) or no more active hash tables remain (not shown), in which case hashing unit controller 34 stores the key value to stash 68 (assuming that space is available in the stash).

Assuming that hashing unit controller 34 discovers an available cell of a bucket of one of the remaining active hash tables to which the extracted key value is mapped ("YES" branch of 156), hashing unit controller 34 stores data for the extracted key value in the available cell of the bucket of the active hash table (160). Hashing unit controller 34 then determines whether the last key value of the hash table to be deactivated has been merged into the remaining active hash tables (162). If the previously extracted key value was not the last key value of the hash table to be deactivated ("NO" branch of 162), hashing unit controller 34 extracts the next key value (164) and stores the extracted key value to one of the remaining active hash tables. However, after all key values of the hash table to be deactivated have been merged into the remaining active hash tables (or, in some examples, stash 68) ("YES" branch of 162), hashing unit controller 34 deactivates the hash table to be deactivated (166). For example, hashing unit controller 34 causes the power gate for the hash table to be deactivated to stop supplying power to the hashing logic circuitry and/or the hash table memory module for the hash table to be deactivated.

Again, it should be understood that although FIG. 7 illustrates a sequential example, the steps of 152, 154, 156, 158, and 160 may alternatively be performed substantially in parallel. That is, rather than iteratively searching each of the tables, each table may be checked in parallel (e.g., by hardware units) to find an available bucket of one of the tables having an available cell, in some examples. In some examples, when multiple buckets have available cells, hashing unit controller 34 may store the key value in the least loaded bucket, that is, the bucket having the fewest keys.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

The invention claimed is:

1. A method comprising:
receiving, by a hashing unit controller executed by a processing unit, a key value to be stored in a hashing unit comprising a plurality of hardware-based hash tables, wherein each of the hash tables comprises a plurality of buckets, wherein the plurality of hash tables comprise a set of zero or more active hash tables and a set of one or more inactive hash tables, wherein each of the hash tables is associated with a respective one of a plurality of logic circuits that execute a respective one of a plurality of hash functions such that there is a one-to-one correspondence between the hash tables and the hash functions, and wherein the logic circuits associated with the active hash tables are powered on;
determining that one of the inactive hash tables should be activated to increase an available hash space of the hashing unit, wherein the available hash space comprises the buckets of the active hash tables;
based on the determination that the one of the inactive hash tables should be activated, activating the one of the set of inactive hash tables as a recently activated hash table, determining one of the buckets of the recently activated hash table to which the hash function associated with the recently activated hash table maps the received key value, and storing the key value in the determined one of the buckets of the recently activated hash table;
determining that one of the active hash tables can be deactivated;
based on the determination that one of the active hash tables can be deactivated:
extracting key values currently stored by the active hash table to be deactivated;
storing the extracted key values to the active hash tables that are not to be deactivated; and deactivating the active hash table to be deactivated and powering off the logic circuit associated with the active hash table to be deactivated.

2. The method of claim 1, wherein the logic circuits associated with the inactive hash tables are powered off, and wherein activating the one of the set of inactive hash tables comprises powering on the logic circuit associated with the recently activated hash table.

3. The method of claim 1, wherein the plurality of hash tables are associated with respective memory units, wherein the memory units associated with the inactive hash tables are powered off, and wherein activating the one of the set of inactive hash tables comprises powering on the memory unit associated with the recently activated hash table.

4. The method of claim 1, wherein determining that the one of the inactive hash tables should be activated comprises determining that an amount of data stored in the available hash space exceeds a threshold value.

5. The method of claim 1, wherein determining that the one of the inactive hash tables should be activated comprises determining that hash functions associated with the active hash tables map the received key value to buckets of the set of active hash tables that are each currently occupied by a respective maximum amount of key values.

6. The method of claim 5, wherein determining that hash functions associated with the active hash tables map the received key value to buckets of the set of active hash tables that are each currently occupied by a respective maximum amount of key values comprises:
executing the hash functions associated with the active hash tables with the received key value as input to the hash functions;
receiving values of one or more cells for the buckets of the active hash tables to which the hash functions map the received key value, wherein the values comprise respective key portions; and
determining that the received key value does not match any of the key portions of the values of the cells for the buckets to which the hash functions map the received key value.

7. The method of claim 5, wherein each of the plurality of hash tables is associated with a respective one of the hash functions, wherein the hash functions are distinct from each other, and wherein determining that hash functions associated with the active hash tables map the received key value to buckets of the set of active hash tables that are each currently occupied by a respective maximum amount of key values comprises executing only the hash functions associated with the active hash tables, and wherein executing comprises providing the received key value to the hash functions associated with the active hash tables as input to the hash functions associated with the active hash tables.

8. The method of claim 1, wherein each of the plurality of hash tables is associated with a respective one of a plurality of hash functions, wherein the hash functions are distinct from each other, the method further comprising determining a value associated with a query key value, comprising:
executing the hash functions of the active hash tables using the query key value as input to determine buckets of the active hash tables to which the query key value is mapped;
determining a cell of one of the buckets to which the query key value is mapped that is storing the query key value; and
outputting a value of the determined cell as the value to which the query key value is mapped.

9. The method of claim 1, wherein the plurality of hash tables are associated with respective memory units, wherein the memory units associated with the active hash tables are powered on, and wherein deactivating the active hash table to be deactivated comprises powering off the memory unit associated with the active hash table to be deactivated.

10. The method of claim 1, wherein storing the extracted key values to the active hash tables comprises, for each of the extracted key values:
executing the hash function associated with one of the active hash tables that is not to be deactivated using the extracted key value as input;
determining a bucket of the one of the active hash tables that is not to be deactivated to which the executed hash function maps the extracted key value;
determining that at least one cell of the determined bucket is unoccupied; and
storing the extracted key value to the unoccupied cell.

11. The method of claim 1, wherein a router comprises the hashing unit controller, the processing unit, and a plurality of network interfaces, and wherein the key value comprises a destination network address, the method further comprising storing an indication of one of the network interfaces corresponding to a network route to the destination network address with the key value in the determined bucket of the recently activated hash table.

12. The method of claim 1, wherein a router comprises the hashing unit controller, the processing unit, and a plurality of network interfaces, and wherein the key value comprises one or more of a source Internet protocol (IP) address, a destination IP address, a source port, a destination port, and a protocol for a packet, the method further comprising:
retrieving a value associated with the key value; and
determining whether to apply one or more services to the packet based on the retrieved value associated with the key value.

13. The method of claim 1, wherein each of the active hash tables is associated with a respective active hash function, and wherein determining that one of the inactive hash tables should be activated comprises:
executing each of the active hash functions, in parallel, using the received key value as input; and
determining that the execution of each of the active hash functions using the received key value as input results in respective collisions.

14. The method of claim 1, wherein each of the active hash tables is associated with a respective active hash function, the method further comprising:
receiving a query key value to be retrieved from the hashing unit;
executing each of the active hash functions, in parallel, using the query key value as input; and
returning data in a bucket to which a single one of the active hash functions maps the query key value.

15. A method comprising:
receiving, by a routing device, information defining a route to a network destination comprising a destination address;
determining a network interface of the routing device coupled to a next hop along the route to the network destination;
sending data comprising the destination address and an indication of the network interface to a hashing unit controller executed by a processing unit of the routing device to be stored by a hashing unit of the routing device, wherein the hashing unit comprises a plurality of hardware-based hash tables, wherein each of the hash tables comprises a plurality of buckets, wherein the plurality of hash tables comprise a set of zero or more active hash tables and a set of one or more inactive hash tables, wherein each of the hash tables is associated with a respective one of a plurality of logic circuits that execute a respective one of a plurality of hash functions such that there is a one-to-one correspondence between the hash tables and the hash functions, and wherein the logic circuits associated with the active hash tables are powered on;

determining that one of the inactive hash tables should be activated to increase an available hash space of the hashing unit, wherein the available hash space comprises the buckets of the active hash tables;

based on the determination that the one of the inactive hash tables should be activated:
  activating the one of the set of inactive hash tables as a recently activated hash table;
  determining one of the buckets of the recently activated hash table to which the hash function associated with the recently activated hash table maps the received destination address; and
  storing the data comprising the destination address and the indication of the network interface in the determined one of the buckets of the recently activated hash table;

determining that one of the active hash tables can be deactivated;

based on the determination that one of the active hash tables can be deactivated:
  extracting key values currently stored by the active hash table to be deactivated;
  storing the extracted key values to the active hash tables that are not to be deactivated; and
  deactivating the active hash table to be deactivated and powering off the logic circuit associated with the active hash table to be deactivated.

16. A device comprising:
a hashing unit comprising a plurality of hardware-based hash tables, wherein each of the hash tables comprises a plurality of buckets, wherein the plurality of hash tables comprise a set of zero or more active hash tables and a set of one or more inactive hash tables, wherein each of the hash tables is associated with a respective one of a plurality of logic circuits that execute a respective one of a plurality of hash functions such that there is a one-to-one correspondence between the hash tables and the hash functions, and wherein the logic circuits associated with the active hash tables are powered on;
a computer-readable storage medium comprising instructions for a hashing unit controller for the hashing unit; and
a processing unit configured to execute the hashing unit controller to receive a key value to be stored in the hashing unit, determine that one of the inactive hash tables should be activated to increase an available hash space of the hashing unit, wherein the available hash space comprises the buckets of the active hash tables, based on the determination that the one of the inactive hash tables should be activated, activate the one of the set of inactive hash tables as a recently activated hash table, determine one of the buckets of the recently activated hash table to which the hash function associated with the recently activated hash table maps the received key value, and store the key value in the determined one of the buckets of the recently activated hash table, determine that one of the active hash tables can be deactivated, and based on the determination that one of the active hash tables can be deactivated: extract key values currently stored by the active hash table to be deactivated, store the extracted key values to the active hash tables that are not to be deactivated, and deactivate the active hash table to be deactivated and power off the logic circuit associated with the active hash table to be deactivated.

17. The device of claim 16, wherein the logic circuits associated with the inactive hash tables are powered off, and wherein to activate the one of the set of inactive hash tables, the hashing unit controller powers on the logic circuit associated with the recently activated hash table.

18. The device of claim 16, wherein the plurality of hash tables are associated with respective memory units, wherein the memory units associated with the inactive hash tables are powered off, and wherein to activate the one of the set of inactive hash tables, the hashing unit controller powers on the memory unit associated with the recently activated hash table.

19. The device of claim 16, further comprising a plurality of logic circuits, wherein each of the plurality of logic circuits is associated with a respective one of the plurality of hash tables, wherein each of the plurality of logic circuits is configured to execute a respective one of a plurality of hash functions, and wherein the hash functions are distinct from each other.

20. The device of claim 19, wherein the hashing unit controller is configured to determine a value associated with a query key value, wherein to determine the value associated with the query key value, the hashing unit controller is configured to provide the query key value to the logic circuits associated with the active hash tables to determine buckets of the active hash tables to which the query key value is mapped, determine a cell of one of the buckets to which the query key value is mapped that is storing the query key value, and output a value of the determined cell as the value to which the query key value is mapped.

21. The device of claim 16, wherein to determine that the one of the inactive hash tables should be activated, the hashing unit controller determines that an amount of data stored in the available hash space exceeds a threshold value.

22. The device of claim 16, wherein to determine that the one of the inactive hash tables should be activated, the hashing unit determines that hash functions associated with the active hash tables map the received key value to buckets of the set of active hash tables that are each currently occupied by a respective maximum amount of key values.

23. The device of claim 16, wherein the device comprises a router, the router further comprising a plurality of network interfaces, wherein the key value comprises a network destination address associated with a route received by the router, wherein the processing unit comprises a forwarding engine of the router, and wherein the forwarding engine is configured to store data comprising the destination address and an indication of one of the network interfaces along the route to the destination address to the hashing unit such that the hashing unit comprises a forwarding information base of the router.

24. A routing device comprising:
a plurality of network interfaces;
a hashing unit comprising a plurality of hardware-based hash tables, wherein each of the hash tables comprises a plurality of buckets, wherein the plurality of hash tables comprise a set of zero or more active hash tables and a set of one or more inactive hash tables, wherein each of the hash tables is associated with a respective one of a plurality of logic circuits that execute a respective one of a plurality of hash functions such that there is a one-to-one correspondence between the hash tables and the hash functions, and wherein the logic circuits associated with the active hash tables are powered on;

a routing engine configured to receive information defining a route to a network destination comprising a destination address; and a forwarding engine configured to generate data that associates one of the network interfaces of the routing device coupled to a next hop along the route to the network destination with the destination address, and to store the data to the hashing unit via a hashing unit controller, wherein the hashing unit controller is configured to determine that one of the inactive hash tables should be activated to increase an available hash space of the hashing unit, wherein the available hash space comprises the buckets of the active hash tables, based on the determination that the one of the inactive hash tables should be activated, to activate the one of the set of inactive hash tables as a recently activated hash table, determine one of the buckets of the recently activated hash table to which the hash function associated with the recently activated hash table maps the received destination address, and store the data comprising the destination address and the indication of the network interface in the determined one of the buckets of the recently activated hash table, determine that one of the active hash tables can be deactivated, and based on the determination that one of the active hash tables can be deactivated: extract key values currently stored by the active hash table to be deactivated, store the extracted key values to the active hash tables that are not to be deactivated, and deactivate the active hash table to be deactivated and power off the logic circuit associated with the active hash table to be deactivated.

25. A non-transitory computer-readable storage medium comprising instructions that, when executed, cause a processor to:

receive a key value to be stored in a hashing unit comprising a plurality of hardware-based hash tables, wherein each of the hash tables comprises a plurality of buckets, wherein the plurality of hash tables comprise a set of zero or more active hash tables and a set of one or more inactive hash tables, wherein each of the hash tables is associated with a respective one of a plurality of logic circuits that execute a respective one of a plurality of hash functions such that there is a one-to-one correspondence between the hash tables and the hash functions, and wherein the logic circuits associated with the active hash tables are powered on;

determine that one of the inactive hash tables should be activated to increase an available hash space of the hashing unit, wherein the available hash space comprises the buckets of the active hash tables;

based on the determination that the one of the inactive hash tables should be activated:
  activate the one of the set of inactive hash tables as a recently activated hash table;
  determine one of the buckets of the recently activated hash table to which the hash function associated with the recently activated hash table maps the received key value; and
  store the key value in the determined one of the buckets of the recently activated hash table;

determine that one of the active hash tables can be deactivated;

based on the determination that one of the active hash tables can be deactivated:
  extract key values currently stored by the active hash table to be deactivated;
  store the extracted key values to the active hash tables that are not to be deactivated; and
  deactivate the active hash table to be deactivated and power off the logic circuit associated with the active hash table to be deactivated.

* * * * *